Dec. 24, 1968           G. COURTNEY           3,418,041
SPECTACLE HINGE PIN FOR DETACHABLE TEMPLE PIECES
Filed Aug. 18, 1964
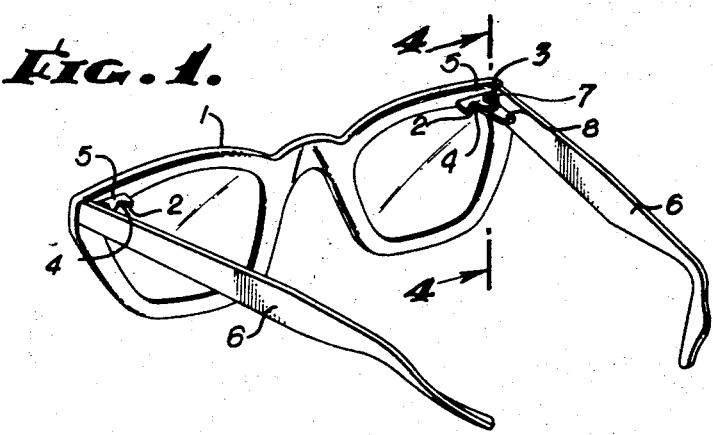
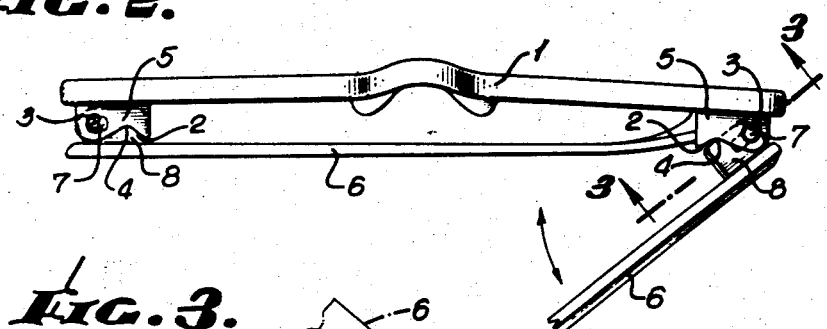
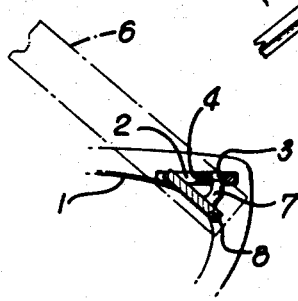
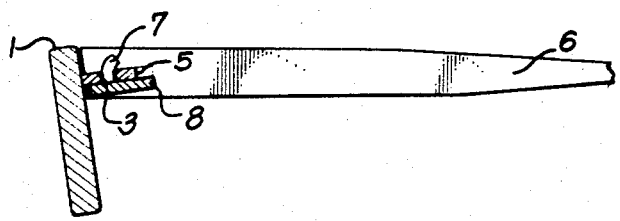
INVENTOR.
Gerald Courtney

United States Patent Office 3,418,041
Patented Dec. 24, 1968

3,418,041
SPECTACLE HINGE PIN FOR DETACHABLE
TEMPLE PIECES
Gerald Courtney, 6311 Yucca St.,
Hollywood, Calif. 90028
Filed Aug. 18, 1964, Ser. No. 390,316
1 Claim. (Cl. 351—153)

ABSTRACT OF THE DISCLOSURE

A spectacle temple piece is provided with a lug mounted curved hinge pin which removably engages a spectacle frame lug hole and thereby operatively secures the temple piece to the frame. The attachment of the temple piece to the frame is facilitated by a notch in the rear of the frame lug.

---

The primary object of this invention is to provide a quick and easy means for interchanging spectacle temple pieces in accordance with the wearer's preference of colors.

A further object of the invention is to provide a new and useful means for quickly attaching a spectacle temple piece to a frame without the use of tools or the need for undue force.

In the accompanying drawing like reference characters indicate like parts in the several views, and:

FIG. 1 is a perspective view of a spectacle embodying the invention.

FIG. 2 is a top plan view showing one temple piece being attached to the spectacle frame.

FIG. 3 is a sectional view taken along the line 3—3 of FIG. 2.

FIG. 4 is a sectional view taken along the line 4—4 of FIG. 1.

Referring now more particularly to the drawings, the numeral 1 indicates a spectacle frame having conventional lenses, lens rims and nose bridge. Attached horizontally to the upper rear outside area of the lens rim is a lug 5 which has an arcuate shaped outer surface area with a hole 3 extending through the central part thereof; and an indented inner rear edge. The indented inner rear edge is formed by an angled rear edge portion 2 generally intersecting the edge of the arcuate surface to define a notch 4 in the rear inner edge of the lug 5.

The spectacle temple piece 6 is conventional in shape and has a lug 8 mounted angularly to its front inside surface. On the top surface of lug 8 there is mounted a hinge pin 7 which projects parallel to the temple piece in an upwardly and rearwardly curved manner such that it forms a hook of a suitable size to engage the hole 3.

When the temple piece 6 is held by the hand in a tilted or vertically angular position with its inside surface adjacent to the straight edge surface of notch 4, the hinge pin 7 may be brought into partial engagement with the hole 3. The temple piece is then brought into operative engagement with the spectacle frame by swinging the rear terminal end of the temple piece downwardly until the hole 3 is fully engaged by the hinge pin 7. The temple connection thereafter is maintained in the operatively open and closed positions respectively by the abutment of the temple piece front end with the frame, and by the contact of the upper surface of lug 8 with the inside bottom surface area of lug 5. The detachment of the temple piece is a simple matter of performing the converse of the foregoing attachment procedure.

In the fabrication of the entire spectacle device, the lugs may be secured to their respective parts by rivets, cement or integrally molded and may be formed from plastic or other suitable material.

While I disclose the preferred embodiment of my invention, it should be understood that I intend to include all embodiments thereof which would be apparent to one skilled in the art and which come within the scope of the invention as defined in the appended claim.

What is claimed is:

1. In a pair of spectacles, a hinge device for detachable temple pieces comprising a first lug mounted horizontally to the upper rear outside area of the spectacle lens rim, said first lug having an outer arcuate shaped surface area with a hole through the center thereof and a notch located in the rear edge inwardly of the arcuate portion, a second lug mounted at an angle to the front inside area of a temple piece; and a hinge pin mounted on the top surface of the second lug, said pin extending in an upwardly and rearwardly curved manner parallel to the temple piece such that it may be brought into hooking engagement with the hole in the first lug, said hooking engagement being effected when the temple piece is in a downwardly angled position adjacent to the said notch.

References Cited

UNITED STATES PATENTS

| | | | |
|---|---|---|---|
| 926,949 | 7/1909 | Maas | 351—153 X |
| 1,271,669 | 7/1918 | Collings | 351—116 |
| 2,060,700 | 8/1935 | Thomson | 351—116 |
| 2,276,372 | 4/1940 | Courtney | 2—12 |

DAVID SCHONBERG, *Primary Examiner.*

W. L. BROWN, *Assistant Examiner.*

U.S. Cl. X.R.
351—116, 121